(12) United States Patent  
Rowell et al.

(10) Patent No.: US 8,571,965 B2  
(45) Date of Patent: Oct. 29, 2013

(54) TECHNIQUES FOR REDUCING DELTA VALUES OF CREDIT RISK POSITIONS IN ONLINE TRADING OF CREDIT DERIVATIVES

(75) Inventors: Mark A. Rowell, Enfield (GB); Christopher J. Crowley, New York, NY (US); F. Charles Doerr, New York, NY (US)

(73) Assignee: Creditex Group, Inc., New York, NY (US)

( * ) Notice: Subject to any disclaimer, the term of this patent is extended or adjusted under 35 U.S.C. 154(b) by 1064 days.

(21) Appl. No.: 12/245,875

(22) Filed: Oct. 6, 2008

(65) Prior Publication Data

US 2009/0125451 A1 May 14, 2009

Related U.S. Application Data

(60) Provisional application No. 60/987,993, filed on Nov. 14, 2007.

(51) Int. Cl.
 *G06Q 40/00* (2012.01)
(52) U.S. Cl.
 USPC .............................. 705/37; 705/35; 705/36 R
(58) Field of Classification Search
 USPC ................................................... 705/35–37
 See application file for complete search history.

(56) References Cited

U.S. PATENT DOCUMENTS

| 5,872,725 A | 2/1999 | Ninomiya et al. |
| 5,950,176 A | 9/1999 | Keiser et al. |
| 5,970,479 A | 10/1999 | Shepherd |
| 6,304,858 B1 | 10/2001 | Mosler et al. |
| 6,317,727 B1 | 11/2001 | May |

(Continued)

FOREIGN PATENT DOCUMENTS

EP 1 821 254 8/2007

OTHER PUBLICATIONS

Willa E. Gibson, "Are Swap Agreements Securities or Futures?: The Inadequacies of Applying the Traditional Regulatory Approach to OTC Derivatives Transactions," Winter 1999, University of Iowa, vol. 24, section II.E (cited as 24 Iowa J. Corp.).

(Continued)

*Primary Examiner* — Alexander Kalinowski
*Assistant Examiner* — Abhishek Vyas
(74) *Attorney, Agent, or Firm* — DLA Piper LLP (US)

(57) ABSTRACT

Techniques for reducing delta values of credit risk positions in online trading of credit derivatives are disclosed. In one particular exemplary embodiment, a method for reducing delta values may comprise: receiving, in an online trading system of credit derivatives, a plurality of credit risk positions submitted by a plurality of trader clients, each credit risk position having a delta value and a maturity date, wherein each trader client's submission is unknown to other trader clients: identifying, from the plurality of trader clients, at least two trader clients who hold offsetting credit risk positions on at least two maturity dates; determining delta offsets to be applied to delta values of the credit risk positions held by the at least two trader clients and having the at least two maturity dates, such that an overall delta of each of the at least two trader clients' credit risk positions remains substantially unchanged after the application of the delta offsets; calculating, based on the determined delta offsets, notional amounts of credit derivative trades needed to realize the delta offsets; and executing the credit derivative trades among the at least two trader clients.

21 Claims, 15 Drawing Sheets

(56) References Cited

U.S. PATENT DOCUMENTS

| | | |
|---|---|---|
| 6,347,307 B1 | 2/2002 | Sandhu et al. |
| 6,363,360 B1 | 3/2002 | Madden |
| 6,377,940 B2 | 4/2002 | Tilfors et al. |
| 6,405,180 B2 | 6/2002 | Tilfors et al. |
| 6,408,282 B1 | 6/2002 | Buist |
| 6,421,653 B1 | 7/2002 | May |
| 6,505,174 B1 | 1/2003 | Keiser et al. |
| 6,618,707 B1 | 9/2003 | Gary |
| 6,725,201 B2 | 4/2004 | Joao |
| 6,996,540 B1 | 2/2006 | May |
| 7,177,833 B1 | 2/2007 | Marynowski et al. |
| 7,212,997 B1 | 5/2007 | Pine et al |
| 7,251,629 B1 | 7/2007 | Marynowski et al. |
| 7,266,521 B1 | 9/2007 | Handa et al. |
| 7,333,950 B2 | 2/2008 | Shidler et al. |
| 7,376,614 B1 * | 5/2008 | Scheinberg et al. ............ 705/37 |
| 7,970,670 B2 * | 6/2011 | Patterson et al. ............... 705/30 |
| 2001/0056393 A1 | 12/2001 | Tilfors et al. |
| 2002/0042765 A1 | 4/2002 | Dawson |
| 2002/0052822 A1 | 5/2002 | Terashima |
| 2002/0055897 A1 | 5/2002 | Shidler et al. |
| 2002/0099651 A1 | 7/2002 | May |
| 2002/0116288 A1 | 8/2002 | Nakajima et al. |
| 2002/0116314 A1 | 8/2002 | Spencer et al. |
| 2002/0116317 A1 | 8/2002 | May |
| 2002/0161693 A1 | 10/2002 | Greenwald |
| 2002/0194107 A1 | 12/2002 | Li et al. |
| 2003/0009419 A1 * | 1/2003 | Chavez et al. .................. 705/38 |
| 2003/0018561 A1 | 1/2003 | Kitchen et al. |
| 2003/0083978 A1 | 5/2003 | Brouwer |
| 2003/0115129 A1 | 6/2003 | Feaver et al. |
| 2003/0224854 A1 | 12/2003 | Joao |
| 2003/0225658 A1 * | 12/2003 | Whaley ........................... 705/36 |
| 2004/0024692 A1 | 2/2004 | Turbeville et al. |
| 2004/0111355 A1 | 6/2004 | Hirani et al. |
| 2004/0162862 A1 | 8/2004 | Hull et al. |
| 2004/0236636 A1 | 11/2004 | Lutnick et al. |
| 2005/0080734 A1 | 4/2005 | Lynch et al. |
| 2005/0097029 A1 | 5/2005 | Cooper |
| 2005/0108128 A1 | 5/2005 | Kastel et al. |
| 2005/0131796 A1 * | 6/2005 | Bridges et al. .................. 705/36 |
| 2005/0144104 A1 * | 6/2005 | Kastel ............................. 705/35 |
| 2005/0149426 A1 | 7/2005 | Jokisch et al. |
| 2005/0149428 A1 | 7/2005 | Gooch et al. |
| 2006/0020526 A1 * | 1/2006 | Viner .............................. 705/35 |
| 2006/0036535 A1 | 2/2006 | Hirani et al. |
| 2006/0059064 A1 * | 3/2006 | Glinberg et al. ................ 705/35 |
| 2006/0143099 A1 | 6/2006 | Partlow et al. |
| 2006/0195375 A1 | 8/2006 | Bohn |
| 2006/0242061 A1 | 10/2006 | Axilrod |
| 2007/0078742 A1 | 4/2007 | Biase |

OTHER PUBLICATIONS

BBA—British Banker's Association, "The BBA LIBOR Fixing & Definition," Nov. 7, 2002.
"Poll: What is the Delta of the iTraxx Equity Tranche?," Wilmott forums, Nov. 15, 2004, http://www.wilmott.com/messageview.cfm?catid=4&threadid=21942.

* cited by examiner

| ORIGINAL DELTA POSITIONS | | | | | |
|---|---|---|---|---|---|
| MATURITY | A | B | C | D | E |
| 20-DEC-07 | 1.46 | | | 1,610.67 | 484.73 |
| 20-MAR-08 | 5,238.30 | 4,534.16 | 815.98 | 5.54 | -9,003.89 |
| 20-JUN-08 | 5.86 | -6,020.05 | -2.01 | -8,884.56 | 8,672.05 |
| 20-SEP-08 | 14,771.74 | -4.72 | -2.89 | 8.53 | -15,991.59 |
| 20-DEC-08 | 4.89 | 13,073.32 | 6,862.44 | 10.66 | -26,231.69 |
| 20-MAR-09 | -152.24 | -2.57 | -14,650.17 | 13.22 | 16,293.73 |
| 20-JUN-09 | 43,559.21 | -3.05 | 12,046.42 | 15,999.94 | -13,257.97 |
| 20-SEP-09 | 16.54 | 13,030.79 | -1.51 | 16.19 | -2,246.02 |
| 20-DEC-09 | -54,377.68 | | -21,997.59 | -10,338.15 | -2,365.77 |
| 20-MAR-10 | 12.15 | -18,354.45 | 13,411.55 | 53,913.67 | -41.30 |
| 20-JUN-10 | 657.15 | 1.09 | -33,189.86 | -36,430.75 | 56,667.88 |
| 20-SEP-10 | 14.52 | 1.09 | -10,092.12 | -6.91 | -88,119.52 |
| 20-DEC-10 | 31,557.83 | -11,863.47 | -3.55 | 27,419.87 | 1,257.63 |
| 20-MAR-11 | 16.76 | 14,212.51 | -84,080.18 | -17.79 | -26,059.78 |
| 20-JUN-11 | 64,186.26 | 3.68 | 48,094.23 | 50,597.53 | -48,198.94 |
| 20-SEP-11 | 39.39 | 56,600.55 | -5,649.46 | -52,296.53 | -15.49 |
| 20-DEC-11 | 41.94 | 21.54 | -69,815.92 | -54,637.14 | 42,060.71 |
| 20-MAR-12 | 44.74 | 22.88 | -39.21 | -34.15 | -23,434.18 |
| 20-JUN-12 | 47.88 | 24.45 | -42.03 | 56,789.61 | -53,253.27 |
| 20-SEP-12 | 9,943.79 | 25.83 | 56,176.67 | -44.73 | -53.56 |
| 20-DEC-12 | 55.92 | 26.99 | -29.85 | -46.82 | -80,394.34 |
| 20-MAR-13 | 59.47 | 28.73 | -71,532.39 | -49.79 | -48.04 |
| 20-JUN-13 | 63,763.12 | 68,514.02 | -7.76 | -53.15 | -51.30 |
| 20-SEP-13 | 52.34 | 71,080.75 | -55,472.79 | -17,347.20 | 14,716.92 |
| 20-DEC-13 | 54.39 | -2,384.63 | -11.82 | -12.95 | 98,739.50 |
| 20-MAR-14 | -9,115.48 | 42,625.51 | -12.50 | -91,071.52 | -70.00 |
| 20-JUN-14 | 57.87 | 67,634.61 | 79,644.96 | -54,829.55 | -74.93 |
| 20-SEP-14 | -83,803.94 | -132,571.00 | -31,111.21 | -27.94 | 95,339.63 |
| 20-DEC-14 | 31.21 | 75.03 | 17.62 | 195,017.52 | -53.26 |
| 20-MAR-15 | 33.11 | 2,952.95 | 18.69 | -59,660.76 | -116,738.50 |
| 20-JUN-15 | 114,238.37 | 70.16 | 19.85 | 127,577.87 | -16,029.82 |
| 20-SEP-15 | 40,664.06 | 71.90 | 20.33 | -8.69 | -21,189.36 |
| 20-DEC-15 | -87,204.17 | 85,389.95 | 70,371.82 | -9.03 | 44,303.65 |
| 20-MAR-16 | 20.65 | -102,936.25 | 27.93 | 25,905.19 | 19,726.25 |
| 20-JUN-16 | 21.57 | -56,161.76 | 57,861.20 | -4.11 | -81,388.80 |
| 20-SEP-16 | 22.42 | -100,969.02 | 92,622.03 | -85,502.91 | -51.27 |
| 20-DEC-16 | 192,726.04 | 8.38 | 6.22 | -131,347.18 | 22,906.89 |
| 20-MAR-17 | 13.54 | 8.74 | 6.48 | 58,719.05 | 23,330.38 |
| 20-JUN-17 | 14.20 | 9.16 | -19,499.68 | -55.18 | -170,304.67 |
| 20-SEP-17 | -11,802.53 | -144,925.43 | 1.27 | 131,452.34 | -49.81 |
| 20-DEC-17 | 50,142.71 | 136,137.45 | -20,792.83 | -142,418.37 | 350,228.99 |

| | A | B | C | D | E |
|---|---|---|---|---|---|
| TOTAL DELTA | 223.27 | -9.90 | -12.02 | -78.23 | 11.88 |
| TOTAL ABSOLUTE DELTA | 878,587.43 | 1,152,383.56 | 876,063.41 | 1,490,193.52 | 1,589,445.98 |
| VARIANCE | 2.09E+09 | 2.72E+09 | 1.32E+09 | 3.82E+09 | 5.56E+09 |

FIG. 4A

| FILTERED DELTA POSITIONS | | | | | |
|---|---|---|---|---|---|
| MATURITY | A | B | C | D | E |
| 20-DEC-07 | | | | 1,610.67 | 484.73 |
| 20-MAR-08 | 5,238.30 | 4,534.16 | 815.96 | | -9,003.89 |
| 20-JUN-08 | | -6,020.05 | | -8,884.56 | 8,672.05 |
| 20-SEP-08 | 14,771.74 | | | | -15,991.59 |
| 20-DEC-08 | | 13,073.32 | 6,862.44 | | 26,231.69 |
| 20-MAR-09 | -152.24 | | -14,650.17 | | 16,293.73 |
| 20-JUN-09 | 43,559.21 | | 12,046.42 | 15,999.94 | -13,257.97 |
| 20-SEP-09 | | 13,030.79 | | | -2,246.02 |
| 20-DEC-09 | -54,377.68 | | -21,997.59 | -10,338.15 | -2,365.77 |
| 20-MAR-10 | | -18,354.45 | 13,411.55 | 53,913.67 | |
| 20-JUN-10 | 657.15 | | -33,189.86 | -36,430.75 | 56,667.88 |
| 20-SEP-10 | | | -10,092.12 | | -88,119.52 |
| 20-DEC-10 | 31,557.83 | -11,863.47 | | 27,419.87 | 1,257.63 |
| 20-MAR-11 | | 14,212.51 | -84,080.18 | | -26,059.78 |
| 20-JUN-11 | 64,186.26 | | 48,094.23 | 50,597.53 | -48,198.94 |
| 20-SEP-11 | | 56,600.55 | -5,649.46 | -52,296.53 | |
| 20-DEC-11 | | | -69,815.92 | -54,637.14 | 42,060.71 |
| 20-MAR-12 | | | | | -23,434.18 |
| 20-JUN-12 | | | | 56,789.61 | -53,253.27 |
| 20-SEP-12 | 9,943.79 | | 56,176.67 | | |
| 20-DEC-12 | | | | | -80,394.34 |
| 20-MAR-13 | | | -71,532.39 | | |
| 20-JUN-13 | 63,763.12 | 68,514.02 | | | |
| 20-SEP-13 | | 71,080.75 | -55,472.79 | -17,347.20 | 14,716.92 |
| 20-DEC-13 | | -2,384.63 | | | 98,339.63 |
| 20-MAR-14 | -9,115.48 | 42,625.51 | | -91,071.52 | |
| 20-JUN-14 | | 67,634.61 | 79,644.96 | -54,829.55 | |
| 20-SEP-14 | -83,803.94 | -132,571.00 | -31,111.21 | | 95,339.63 |
| 20-DEC-14 | | | | 195,017.52 | |
| 20-MAR-15 | | 2,952.95 | | -59,660.76 | -116,738.50 |
| 20-JUN-15 | 114,238.37 | | | 127,577.87 | -16,029.82 |
| 20-SEP-15 | 40,664.06 | | | | -21,189.36 |
| 20-DEC-15 | -87,204.17 | 85,389.95 | 70,371.82 | | 44,303.65 |
| 20-MAR-16 | | -102,936.25 | | 25,905.19 | 19,726.25 |
| 20-JUN-16 | | -56,161.76 | 57,861.20 | | -81,388.80 |
| 20-SEP-16 | | -100,969.02 | 92,622.03 | -85,502.91 | |
| 20-DEC-16 | -192,726.04 | | | -131,347.18 | 22,906.89 |
| 20-MAR-17 | | | | 58,719.05 | 23,330.38 |
| 20-JUN-17 | | | -19,499.68 | | -170,304.67 |
| 20-SEP-17 | -11,802.53 | -144,925.43 | | 131,452.34 | |
| 20-DEC-17 | 50,142.71 | 136,137.45 | -20,792.83 | -142,418.37 | 350,228.99 |
| TOTAL DELTA | -459.56 | -399.48 | 23.11 | 238.88 | 520.83 |
| TOTAL ABSOLUTE DELTA | 877,904.61 | 1,151,972.62 | 875,791.50 | 1,489,768.14 | 1,588,937.03 |
| VARIANCE | 2.09E+09 | 2.72E+09 | 1.32E+09 | 3.82E+09 | 5.56E+09 |

FIG. 4B

| NETTED DELTAS | | | | | |
|---|---|---|---|---|---|
| MATURITY | A | B | C | D | E |
| 20-DEC-07 | | | | 1,610.57 | 484.73 |
| 20-MAR-08 | 1,584.55 | 0.00 | 0.00 | | 0.00 |
| 20-JUN-08 | | 0.00 | | -6,232.56 | 0.00 |
| 20-SEP-08 | 0.00 | | | | -1,219.85 |
| 20-DEC-08 | | 0.00 | 0.00 | | -8,295.93 |
| 20-MAR-09 | 0.00 | | 5,272.30 | | 6,763.63 |
| 20-JUN-09 | 30,301.23 | | 12,046.42 | 15,999.94 | 0.00 |
| 20-SEP-09 | | 10,764.77 | | | 0.00 |
| 20-DEC-09 | -54,377.68 | | -21,997.59 | -10,338.15 | -2,365.77 |
| 20-MAR-10 | | 0.00 | 0.00 | 48,970.77 | |
| 20-JUN-10 | 0.00 | | -32,532.71 | 0.00 | 20,237.13 |
| 20-SEP-10 | | | -10,092.12 | | -88,119.52 |
| 20-DEC-10 | 20,951.99 | 0.00 | | 27,419.87 | 0.00 |
| 20-MAR-11 | | 0.00 | -69,867.57 | | -26,059.78 |
| 20-JUN-11 | 15,987.31 | | 48,094.23 | 50,597.53 | 0.00 |
| 20-SEP-11 | | 46,008.20 | 0.00 | -47,353.63 | |
| 20-DEC-11 | | | -69,815.92 | -10,486.63 | 27,890.20 |
| 20-MAR-12 | | | | | -23,434.18 |
| 20-JUN-12 | | | | 3,536.34 | 0.00 |
| 20-SEP-12 | 9,943.79 | | 56,176.67 | | |
| 20-DEC-12 | | | | | -80,394.34 |
| 20-MAR-13 | | | -71,532.39 | | |
| 20-JUN-13 | 63,763.12 | 68,514.02 | | | |
| 20-SEP-13 | | 15,607.96 | 0.00 | -17,347.20 | 14,716.92 |
| 20-DEC-13 | | 0.00 | | | 96,354.87 |
| 20-MAR-14 | 0.00 | 7,604.85 | | -65,166.34 | |
| 20-JUN-14 | | 12,805.06 | 79,644.96 | 0.00 | |
| 20-SEP-14 | 0.00 | -121,035.31 | -31,111.21 | | 0.00 |
| 20-DEC-14 | | | | 195,017.89 | |
| 20-MAR-15 | | 0.00 | | -59,660.76 | -113,785.55 |
| 20-JUN-15 | 98,208.56 | | | 127,577.87 | 0.00 |
| 20-SEP-15 | 19,474.70 | | | | 0.00 |
| 20-DEC-15 | -51,911.25 | 83,899.58 | 69,714.68 | | 11,158.24 |
| 20-MAR-16 | | 75,422.62 | | 0.00 | 18,117.80 |
| 20-JUN-16 | | 0.00 | 0.00 | | -79,689.35 |
| 20-SEP-16 | | 74,414.74 | 66,067.75 | -85,502.91 | |
| 20-DEC-16 | -192,726.04 | | | -131,347.18 | 22,906.89 |
| 20-MAR-17 | | | | 58,719.05 | 23,330.38 |
| 20-JUN-17 | | | -19,499.68 | | -170,304.67 |
| 20-SEP-17 | 0.00 | -25,275.63 | | 0.00 | |
| 20-DEC-17 | 38,340.18 | 50,524.38 | 0.00 | 65,795.58 | 350,228.99 |
| TOTAL DELTA | -459.56 | -399.48 | 23.11 | 238.88 | 520.83 |
| TOTAL ABSOLUTE DELTA | 597,570.40 | 591,897.11 | 663,466.31 | 1,058,660.77 | 1,183,858.71 |
| VARIANCE | 1.50E+09 | 1.09E+09 | 9.77E+08 | 2.62E+09 | 4.97E+09 |

FIG. 4C

| MATURITY | A | B | C | D | E |
|---|---|---|---|---|---|
| 20-MAR-10 | 0.00 | -18,354.13 | 7,683.70 | -1,172.57 | 18,913.61 |
| 20-JUN-10 | 657.15 | 0.00 | 0.00 | 0.00 | 0.00 |
| 20-SEP-10 | 0.00 | -11,863.05 | 0.00 | 0.00 | 0.00 |
| 20-DEC-10 | 31,557.83 | 0.00 | 0.00 | 14,815.22 | 0.00 |
| 20-MAR-11 | 0.00 | 0.00 | -1,265.80 | 0.00 | 13,966.94 |
| 20-JUN-11 | 64,186.26 | 0.00 | 0.00 | -10,385.66 | 16,420.72 |
| 20-SEP-11 | 0.00 | 56,601.08 | -11,771.58 | -16,010.00 | 14,480.24 |
| 20-DEC-11 | 0.00 | 0.00 | 18,086.34 | 1,814.84 | 7,576.14 |
| 20-MAR-12 | 0.00 | 0.00 | 0.00 | 0.00 | 0.00 |
| 20-JUN-12 | 0.00 | 0.00 | 0.00 | -6,434.52 | 6,920.21 |
| 20-SEP-12 | 9,943.79 | 0.00 | 0.00 | 0.00 | 0.00 |
| 20-DEC-12 | 0.00 | 0.00 | -15,236.88 | 0.00 | 0.00 |
| 20-MAR-13 | 0.00 | 68,514.82 | 0.00 | 0.00 | 0.00 |
| 20-JUN-13 | 63,763.12 | 0.00 | 0.00 | -3,345.62 | -15,340.77 |
| 20-SEP-13 | 0.00 | 71,081.58 | 7,632.41 | 0.00 | 0.00 |
| 20-DEC-13 | 0.00 | -2,383.77 | 0.00 | 0.00 | 10,180.15 |
| 20-MAR-14 | -9,115.48 | 42,626.42 | 0.00 | -14,816.78 | 0.00 |
| 20-JUN-14 | 0.00 | 67,635.58 | 0.00 | 5,788.73 | 1,988.58 |
| 20-SEP-14 | -83,803.94 | -132,569.99 | 0.00 | 0.00 | 4,856.00 |

FIG. 6

| MATURITY | BANK X | BANK Y | BANK Z |
|---|---|---|---|
| ... | ... | ... | ... |
| 1 | $2\delta$ | $-\delta$ | $-\delta$ |
| ... | ... | ... | ... |
| 2 | $\delta$ | ... | $-\delta$ |
| ... | ... | ... | ... |
| 3 | $-3\delta$ | $\delta$ | $2\delta$ |
| ... | ... | ... | ... |

$$\Delta\delta = \begin{Bmatrix} -2\delta & +\delta & +\delta \\ -\delta & & +\delta \\ +3\delta & -\delta & -2\delta \end{Bmatrix}$$

| MATURITY | BANK X | BANK Y | BANK Z |
|---|---|---|---|
| ... | ... | ... | ... |
| 1 | 0.00 | 0.00 | 0.00 |
| ... | ... | ... | ... |
| 2 | 0.00 | ... | 0.00 |
| ... | ... | ... | ... |
| 3 | 0.00 | 0.00 | 0.00 |
| ... | ... | ... | ... |

FIG. 7

FIG. 12 creditex — DNA Auction Trade Summary - James Duffy (DRKW)   ☑ My Trades Only

| Ticker | Term | Side | Counterparty | Amount | Spread | P & L | Edit Trade | Trader name |
|---|---|---|---|---|---|---|---|---|
| VLVY | 20-Mar-2012 | SELL | | 4.5MM | 45 | -562 | ⊗ | jduffy |
| | 20-Jun-2012 | BUY | | 4MM | 47 | | | |
| VLVY | 20-Jun-2012 | SELL | | 4.5MM | 47 | 592 | ⊗ | jduffy |
| | 20-Dec-2012 | BUY | | 4MM | 51 | | | |
| VLVY | 20-Dec-2012 | SELL | | 11MM | 51 | -134 | ⊗ | jduffy |
| | 20-Jun-2013 | BUY | | 10MM | 55 | | | |
| VLVY | 20-Mar-2017 | SELL | | 1MM | 64 | 113 | ⊗ | jduffy |
| | 20-Jun-2017 | BUY | | 1MM | 64.5 | | | |
| MICH | 20-Mar-2009 | SELL | | 8.5MM | 50.8 | -5,668 | ⊗ | jduffy |
| | 20-Jun-2009 | BUY | | 6.5MM | 51.2 | | | |
| MICH | 20-Dec-2010 | SELL | | 1.5MM | 68.7 | 181 | ⊗ | jduffy |
| | 20-Mar-2011 | BUY | | 1.5MM | 74.2 | | | |
| MICH | 20-Mar-2011 | SELL | | 2MM | 74.2 | -457 | ⊗ | jduffy |
| | 20-Sep-2011 | BUY | | 2MM | 85 | | | |
| MICH | 20-Jun-2011 | SELL | | 15MM | 79.5 | -1,933 | ⊗ | jduffy |
| | 20-Sep-2011 | BUY | | 14MM | 85 | | | |
| MICH | 20-Sep-2011 | SELL | | 2MM | 85 | -149 | ⊗ | jduffy |
| | 20-Dec-2011 | BUY | | 2MM | 88.8 | | | |
| MICH | 20-Sep-2011 | SELL | | 6.5MM | 85 | -444 | ⊗ | jduffy |
| | 20-Dec-2011 | BUY | | 6MM | 88.8 | | | |
| MICH | 20-Jun-2012 | SELL | | 5.5MM | 96.3 | -612 | ⊗ | jduffy |
| | 20-Sep-2012 | BUY | | 5MM | 100 | | | |
| MICH | 20-Sep-2014 | SELL | | 3MM | 117.5 | 253 | ⊗ | jduffy |
| | 20-Dec-2014 | BUY | | 3MM | 118.1 | | | |
| PEUGEOT | 20-Jun-2009 | SELL | | 1.5MM | 47.3 | 842 | ⊗ | jduffy |
| | 20-Dec-2009 | BUY | | 1MM | 49.9 | | | |

[Export Trades]  TRADES REVIEWED ☐                                    [Close]

TECHNIQUES FOR REDUCING DELTA VALUES OF CREDIT RISK POSITIONS IN ONLINE TRADING OF CREDIT DERIVATIVES

CROSS REFERENCE TO RELATED APPLICATIONS

This patent application claims priority to U.S. Provisional Application No. 60/987,993, filed Nov. 14, 2007, which is hereby incorporated by reference herein in its entirety.

This patent application is related to U.S. patent application Ser. No. 10/954,629, filed Sep. 29, 2004, U.S. patent application Ser. No. 10/957,217, filed Oct. 1, 2004, U.S. patent application Ser. No. 11/837,159, filed Aug. 10, 2007, and U.S. patent application Ser. No. 10/316,167, filed Dec. 9, 2002. each of which is incorporated herein in its entirety.

FIELD OF THE INVENTION

Embodiments of the present invention relate generally to online trading of financial instruments. More specifically, the present invention relates to techniques for reducing delta values of credit risk positions in online trading of credit derivatives.

BACKGROUND OF THE INVENTION

Electronic trading systems, such as Creditex RealTime® Platform, have brought great efficiency to credit derivative markets. Nowadays, traders or dealers representing large financial institutions (e.g., banks and funds) routinely use electronic trading systems to enter into credit derivative transactions involving large notional amounts. Each financial institution may hold multiple credit risk positions as a result of buying or selling credit derivatives. In the context of a credit default swap (CDS), which is the most traded type of credit derivative, a credit curve may be plotted for a reference entity to show the change in CDS spread as a function of maturity lime. Typical maturities may include but are not limited to: 6-month, 1-year, 2-year, 3-year, 4-year, 5-year, 7-year, and 10-year.

For each CDS position, a delta value may be calculated as a first-order derivative between the present value (PV) of the CDS contract and a corresponding CDS spread. The delta value may indicate how sensitive the CDS contract is in response to a one-basis-point (bps) move in the credit curve. A credit risk position, such as one corresponding to a CDS contract, may also be referred to as a delta position.

While being delta neutral overall (i.e., with respect to parallel shifts in the entire credit curve of a particular reference entity), a financial institution may still be exposed to short/long credit risk positions in successive maturities on the credit curve. FIG. 1 illustrates this problem. FIG. 1 shows an exemplary bar chart where bucketed delta values are plotted along a timeline to highlight one bank's credit risk positions at different maturities. Although all the positive and negative delta values may offset one another and thus add up to almost zero, the large delta variance the large variance of the delta positions could be problematic to the bank holding these credit positions. For example, as the credit curve in question changes slope for different maturity dates, the bank's profit and loss (P&L) will have to swing accordingly. In addition, the bank may be exposed to default gap risk if the delta values toggles between short and long positions too quickly in successive maturities.

Some credit derivative dealers have attempted to solve the above-described problems by engaging one another on a bilateral basis to reduce their risks, i.e., where they are able to find offsetting positions. While this approach provides some risk reduction benefits, it suffers from several limitations. For example, this bilateral process requires "trusted" counterparties due to transparency in disclosure of positions. One counterparty can only expect to mitigate risk positions for which the other counterparty happens to hold offsetting positions. Overall, the existing approach is labor-intensive, time-consuming, error-prone, and ultimately not scalable.

In view of the foregoing, it may be understood that there are significant problems and shortcomings associated with current risk-hedging techniques in credit derivative trading.

SUMMARY OF THE INVENTION

Techniques for reducing delta values of credit risk positions in online trading of credit derivatives are disclosed. In one particular exemplary embodiment, a method for reducing delta values of credit risk positions in an online trading system of credit derivatives may comprise: receiving, in the online trading system of credit derivatives, a plurality of credit risk positions submitted by a plurality of trader clients, each credit risk position having a delta value and a maturity date, wherein each trader client's submission is unknown to other trader clients; identifying, from the plurality of trader clients, at least two trader clients who hold offsetting credit risk positions on at least two maturity dates: determining delta offsets to be applied to delta values of the credit risk positions held by the at least two trader clients and having the at least two maturity dates, such that an overall delta of each of the at least two trader clients' credit risk positions remains substantially unchanged after the application of the delta offsets; calculating, based on the determined delta offsets, notional amounts of credit derivative trades needed to realize the delta offsets; and executing the credit derivative trades among the at least two trader clients.

In another particular exemplary embodiment, an electronic trading system of credit derivatives may comprise: a processor; at least one storage device coupled to the processor; a user interface coupled to the processor via one or more communication networks. The processor may be adapted to communicate with the at least one storage device and the user interface to execute instructions to perform the following tasks; receiving, in the online trading system of credit derivatives, a plurality of credit risk positions submitted by a plurality of trader clients, each credit risk position having a delta value and a maturity date, wherein each trader client's submission is unknown to other trader clients; identifying, from the plurality of trader clients, at least two trader clients who hold offsetting credit risk positions on at least two maturity dates; determining delta offsets to be applied to delta values of the credit risk positions held by the at least two trader clients and having the at least two maturity dates, such that an overall delta of each of the at least two trader clients' credit risk positions remains substantially unchanged after the application of the delta offsets; calculating, based on the determined delta offsets, notional amounts of credit derivative trades needed to realize the delta offsets; and executing the credit derivative trades among the at least two trader clients.

One technical effect of the systems and methods of the present invention is that they facilitate more efficient electronic trading of credit derivatives on modern computers and communications systems. Another technical effect of the systems and methods of the present invention lies in the specialized computer and communication devices and software programs that may be configured and deployed to carry out the delta neutral auction functions and other techniques for reducing delta values of credit risk positions disclosed herein.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIGS. 4A-4C shows a numerical example of a delta netting process involving multiple trader clients in accordance with one embodiment of the present invention.

FIG. 6 shows a numerical example of multiple-leg delta weighted switches in accordance with one embodiment of the present invention.

FIG. 7 shows another numerical example of multiple leg delta weighted switches in accordance with one embodiment of the present invention.

FIGS. 9-13 show exemplary screenshots of a delta netting process in an online credit derivative trading system in accordance with one embodiment of the present invention.

DETAILED DESCRIPTION OF THE INVENTION

Embodiments of the present invention solve the above-described problems in existing risk-hedging techniques by providing an auction mechanism that offers such benefits as risk reduction, trader anonymity, matching efficiency, and straight-thru-processing (STP). In particular, a suite of delta-reduction or delta-netting functionalities may be implemented in or with an online credit derivative trading system to help dealers/traders anonymously and efficiently flatten their delta positions for a series of maturities.

As mentioned earlier, each credit risk position may have an associated delta value. A delta value of a CDS contract at a particular maturity may be typically calculated in two steps. First, a first (i.e., original) present value (PV) of the CDS contract may be calculated based on its corresponding credit curve. Then, the credit curve may be shifted by one basis point at some maturity, and a second (i.e., new) PV of the CDS contract may be calculated. The difference between the first and the second PV may be used to represent the delta value of the CDS contract at the particular maturity. By calculating and then summing delta values for all of a trader client's credit risk positions, a net or overall delta value may be determined for the trader client. A "delta neutral auction" refers to an auction process in at least a part of which a net or overall delta value of a trader client's credit risk positions remains substantially unchanged despite that trader client's participation in trades.

Figure 1:
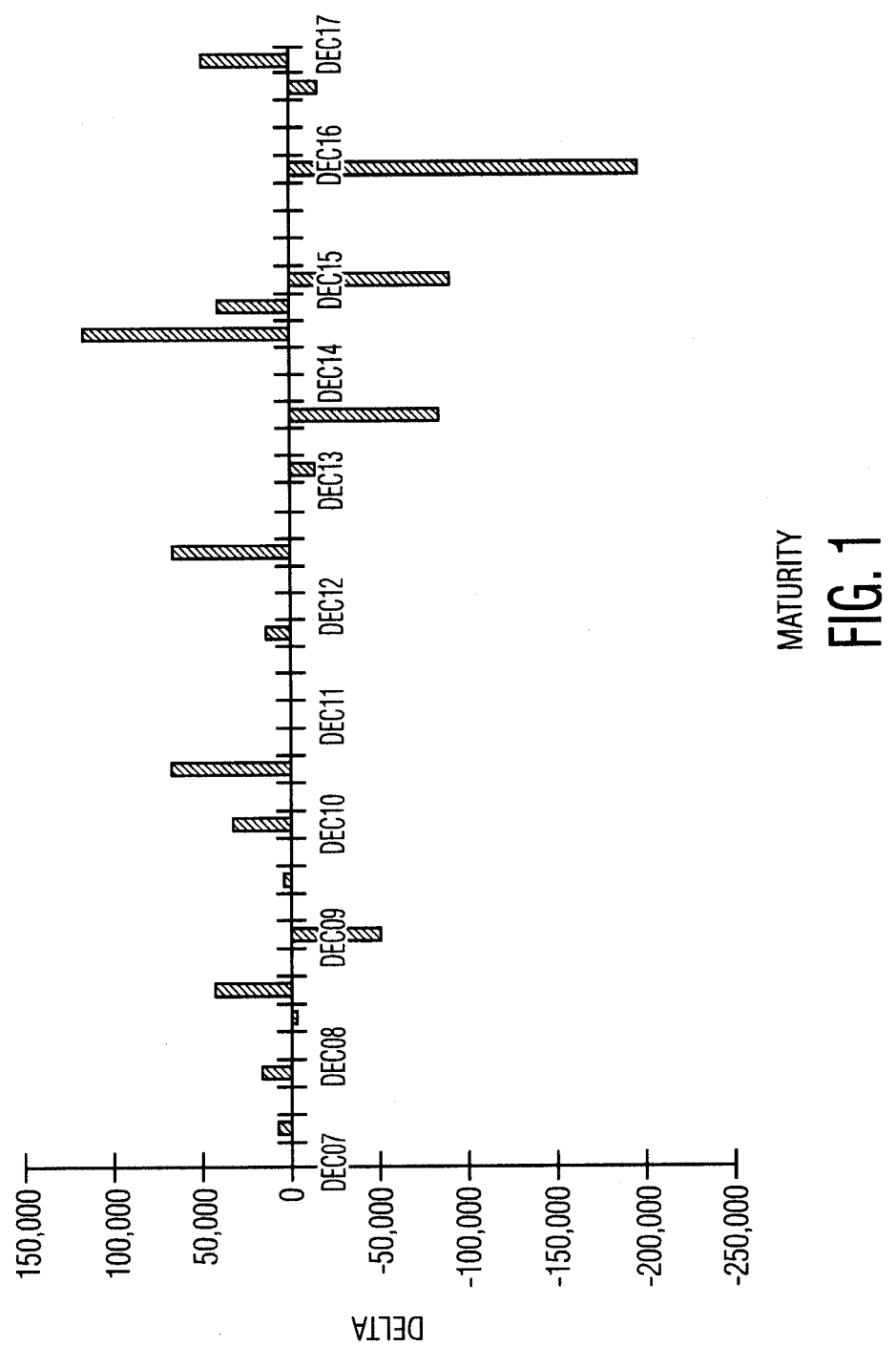
FIG. 1 shows a bar chart illustrating a hypothetical bank's exposure to short/long credit risks in successive maturities.
Figure 2:
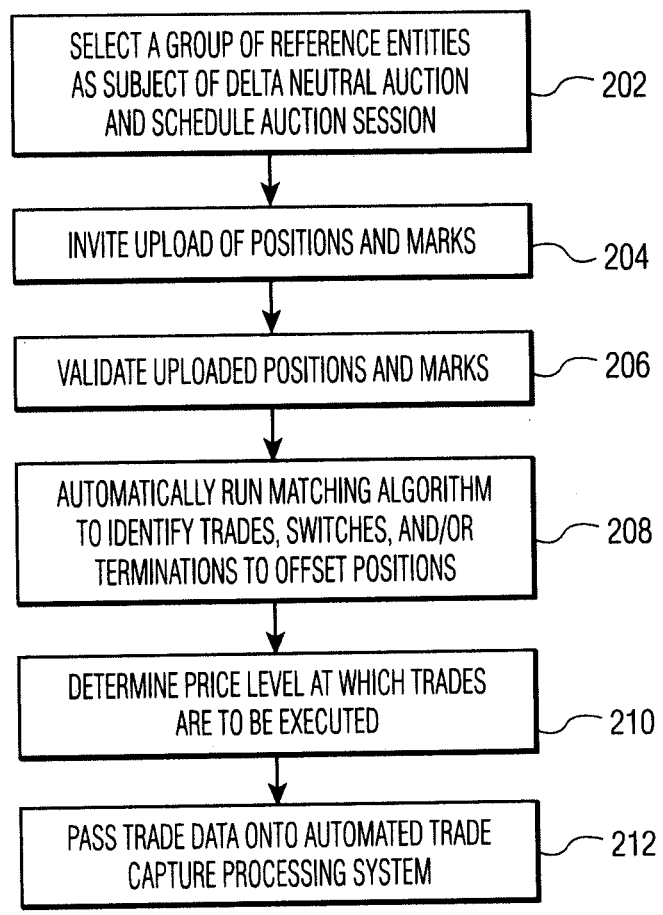
FIG. 2 is a flow chart illustrating an exemplary method of reducing delta values of credit risk positions in accordance with one embodiment of the present invention.

Referring to FIG. 2, there is shown a How chart illustrating an exemplary method of reducing delta values of credit risk positions in accordance with one embodiment of the present invention. The method is typically implemented in connection with an online trading system of credit derivatives, such as Creditex RealTime® Platform.

In step 202, a group of reference entities may be selected as subject of an upcoming auction session, and the auction session may be scheduled. While it is possible to include reference entities from all sectors in a single auction session, it is more preferable to focus on only a limited number of reference entities in each auction. One concern may be that including a large number of reference entities in any given auction session will place a larger burden on traders and trading assistants to upload positions and monitor auction results. Thus, according to one embodiment of the present invention, one sector of credit derivatives or a subset thereof may be selected for inclusion in each auction session. That is, sector-specific auction sessions may be scheduled for a series of different dates. For example, a first auction session for Financial sector credit derivatives may be scheduled on November 16, a second auction session for Automotive sector may be scheduled on November 30, and so on. According to another embodiment, traders and dealers may be allowed to propose their top choices of reference entities for inclusion in an upcoming auction session. For example, each trader client may identify the top 20 reference entities to be included, with or without sector limitations. Then, the trading system may determine a final list of reference entities based on the trader proposals and publish the final list sometime prior to the auction session. The trading system may impose selection rules to ensure a broad coverage of reference entities, for example, by excluding those reference entities that have already been included in an auction within the past three months.

Of course, the scope of coverage may depend on the trading system's capacity and/or trader preferences. If desired, each auction participant may be allowed to submit credit risk positions on any and all reference entities without sector restriction or numerical cap. The auction participants may also be required to submit a credit curve for each reference entity.

In step 204, trader clients may be invited to upload their credit risk positions and marks to the trading system. The uploading may be conducted via a simple yet flexible process. The positions and marks may be first prepared off-line by traders and trading assistants and compiled into a spreadsheet format (e.g., Microsoft® Excel). As long as the spreadsheets include requisite columns for each position and mark, the trading system can easily map the columns to the required information fields. For a credit risk position, the requisite columns may include: Reference Entity Name, Seniority, Maturity, and Amount. The Amount may be either a delta value at Maturity or an equivalent net CDS notional amount. Additionally the Amount may be uploaded as either a risk position or a hedge position. For a mark, the requisite columns may include: Reference Entity Name, Seniority, Maturity, Bid, Offer, and/or Mid. The Mid refers to a proposed mid-fixing price level for trade execution. Alternatively, the trader clients may choose to upload their original trades, and the trading system may calculate their delta positions in relevant reference entities.

Once the uploaded spreadsheets are mapped to information fields readable by the trading system, the credit risk positions and marks may be validated in step 206. For example, the trading system may automatically identify invalid reference entities (e.g., incorrect names and/or correct names not supposed to be in current auction session). Valid reference entity names may be mapped or converted to a standard text string. The validation process may also include highlighting of subordinated reference entities, identification of odd maturity dates (i.e., those other than the IMM dates), and identification of invalid notional amounts (e.g., less than zero or in excess of a billion). IMM stands for the International Monetary Market, and the IMM Dates are the four dates of each year (i.e., March 20, June 20, September 20, and December 20) which most credit default swaps use as their scheduled termination date.

In some instances, especially if the submitted positions resulted from trades previously conducted via the trading system and/or its associated trade-capture system, the trading system may already have information on the reference entities and can easily confirm or verify the positions and associated credit curves.

In step 208, at or near a designated auction start time, the trading system may automatically run a matching algorithm to identify potential trades, switches, or terminations of offsetting positions held by different trader clients. A number of approaches may be taken to automate the matching process in accordance with embodiments of the present invention.

One exemplary approach may be for trader clients to submit a list of trades they would like to execute in an attempt to reduce or flatten their delta positions. The trading system may then match notional amounts of the submitted trades in a pro-rata fashion. That is, for any single reference entity and maturity combination, the system may execute trades such that each dealer on either side of the orders would get its order filled in the same relative amount to the other dealers on the same side of the order book.

For example, consider the following where submissions are two buy orders totaling $3 MM and three sell orders totaling $7 MM:

| Bank | Order Direction | Order Size ($MM) |
|---|---|---|
| A | Buy | 1 |
| B | Buy | 2 |
| C | Sell | 1 |
| D | Sell | 2 |
| E | Sell | 4 |

In this case, the most that can be traded is $3 MM as this is the smaller of the total buy amount and the total sell amount. Using a pro-rata matching process, orders may be filled based on the following relation:
for each bank.

$$\text{Buy (Sell) fill} = \frac{\text{Buy (Sell) order size}}{\text{Total Buy (Sell) order size}} \times \text{Total amount tradable}$$

or, in mathematical notation:

$$f_i = \frac{o_i}{\sum_{j=1}^{n} o_j} \times t_{max}$$

wherein $f_i$ is the fill amount for dealer i on either the buy or sell side (whichever is currently under consideration), $o_i$ is the original order side for the dealer, n is the number of orders on the buy or sell side, and $t_{max}$ is the maximum amount tradable.

Using the above exemplary set of orders, the simple pro-rata matching results for Banks A through E should be as follows:

| Bank | Order Direction | Order Size ($MM) | Fill ($MM) | % Fill |
|---|---|---|---|---|
| A | Buy | 1 | 1 | 100% |
| B | Buy | 2 | 2 | 100% |
| C | Sell | 1 | 0.43 | 42.9% |
| D | Sell | 2 | 0.86 | 42.9% |
| E | Sell | 4 | 1.71 | 42.9% |

As can be seen, on either side of the order book, each bank gets its order filled in the same relative amount as the other banks.

The advantages of the pro-rata matching method may include: (1) it is simple; (2) each credit/maturity can be considered in isolation; and (3) it is fair—no one bank takes priority over another. However, there are also some disadvantages. For example, it is not delta neutral: it does not preserve the trader's overall delta value for the credit in question. For a case where there is a single buy (sell) order and multiple sell (buy) orders, it would be possible for the single buy (sell) side dealer to see relatively who had the largest position to fill. For example, consider the case where there is a single seller with an order size of $3 MM and three buyers with orders of $1 MM, $2 MM and $3 MM, respectively. Using pro-rate filling of orders would lead to the seller executing trades with the following sizes: $0.5 MM, $1 MM, and $1.5 MM, from which the seller could see that the third counterparty had the largest original position. Of course, the seller in this case would not necessarily know that it was the only seller or that the trades executed relied the relative positions of the counterparties.

One approach that preserves delta neutrality whilst reducing or eliminating individual delta values at different maturity buckets is to use a delta-netting procedure. As will be described in more detail below, the delta-netting procedure may involve identifying at least two trader clients who hold offsetting credit risk positions on at least two maturity dates and then applying delta offsets to delta values of the credit risk positions held by the at least two trader clients and having the at least two maturity dates, such that an overall delta of each of the at least two trader clients' credit risk positions remains substantially unchanged after the application of the delta offsets. According to one embodiment of the present invention, when the trading system searches for two delta positions that offset each other, a gap between the two maturities may be limited, for example, to a certain number of months or years. For instance, a 12-month gap limit may be imposed. When a first delta position may be offset against either a second delta position whose maturity is 9 months apart from that of the first delta position or a third delta position whose maturity is 18 months apart from that of the first delta position, the trading system may select the second delta position instead of the third delta position.

Another approach for reducing or eliminating individual delta values may be to selectively terminate, in whole or in part, some credit derivative transactions. This may be achieved by setting up an optimization procedure wherein the variables are the notional amounts of original trades and the objective of the optimization is to minimize the total notional amount. Constraints may be added to the optimization algorithm to ensure: (a) each dealer's total PV can change within a specified range of values; (b) each dealer's total delta can change within a specified range of values; and (c) each dealer's delta at all maturities can change, such that, if the current delta is negative, it can change to a slightly more negative amount but can increase to zero, and, if the current delta is positive, it can change to a slightly more positive amount but decrease to delta. Constraint (c), along with the objective of minimizing total notional across all trades, may enable the optimization procedure to emulate a delta neutral auction (DNA). That is, by allowing delta positions at any maturity to change to be closer to zero and by constraining the total delta to move in a small range of values, the optimization procedure ensures (to some extent) delta neutrality of the resulting set of trades, while simultaneously reducing the variance of delta values for a dealer.

By minimizing total notional, it is possible that a significant number of trades will have their notional amounts reduced to zero, which means theoretically that those trades can be terminated. However, because of the constraints in place on PV and delta (i.e., Constraints (a) and (b)), there will be some trades that can only be partially terminated and others that will remain.

Referring back to FIG. 2, in step 210, one or more price levels may be determined for trades to be executed. Regardless of what matching algorithm is employed in step 208 above, a fair methodology is desirable for executing any resulting trades at a fair market level. According to some embodiments of the present invention, the fair market level may be established based on a third-party benchmark. For example, pricing data from independent providers of dealer "consensus" pricing or aggregators of dealer data may be used as a basis or reference to determine a price level. Potential data providers may include Markit Group Limited, Fitch Ratings (CDS Pricing), and/or CMA Data Vision.

According to other more preferable embodiments of the present invention, the fair market level may be determined through a "mid-fixing" process. First, each participant may be invited to submit a bid and/or offer price level for each position it wishes to execute (or alternatively for every full year point on the credit curve). Alternatively, a participant may submit a mid price, and from that mid price the trading system may synthesize a bid and offer, for example, by subtracting from and adding to the submitted mid a predetermined value (e.g., 1 bps). The submission may be made electronically and limited to a lime window. Second, upon closing of the time window, Creditex® Mid Fixing algorithm may be applied to the submissions to determine a trade level for each full year point on the curve. Third, trade levels for fractional maturities may be determined using linear interpolation between two consecutive full year points.

The Creditex® Mid Fixing algorithm has been described in prior, related applications which are incorporated herein by reference. Here below is a brief description of this algorithm with a numerical example illustrated in FIG. 8. The description will make reference to the following defined terms:

"Contributed Market"—The two-way prices contributed by each individual dealer;
"Matched Market"—A bid and offer that are in the same place (row) in the queue after sorting the bids and offers;
"Crossing Market"—a Matched Market in which the bid of one dealer is higher than the offer of another dealer;
"Touching Market"—a Matched Market in which the bid of one dealer is equal to the offer of another dealer; and
"Tradable market"—either a Crossing or Touching Market.

Figure 8:
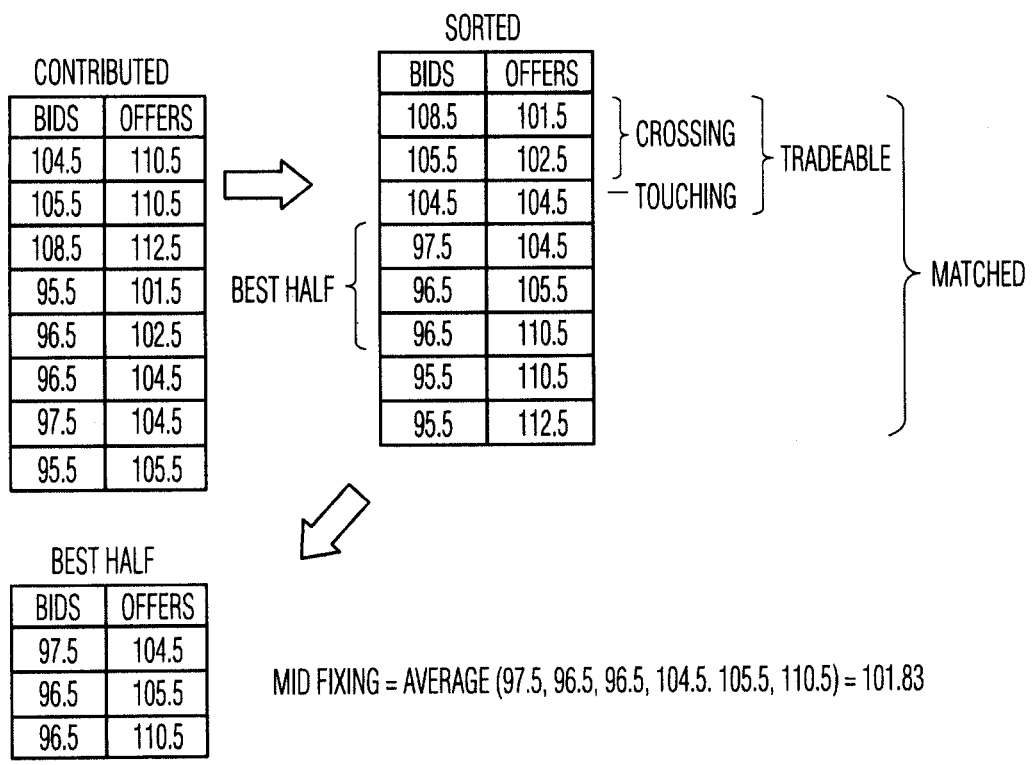
FIG. 8 shows a numerical example illustrating a mid fixing process in accordance with one embodiment of the present invention.

In FIG. 8, the Contributed Markets are listed in the table on the left.

First, bid/offer prices submitted by participants are sorted to match the best (highest) bids with the best (lowest) offers. That is, the bid prices are sorted in an ascending order and the offer prices are soiled in a descending order. In case of a tie, prices entered first are place higher in the queue. In FIG. 8, the sorted bid/offer prices are listed in the table on the right. From top to bottom, the bids decrease and the offer increase. There are 8 Matched Markets, among which the first two are Crossing Markets and the third is a Touching Market.

Next, all the tradable markets (where the bid is greater than or equal to the offer) are discarded. That is, the first three Matched Markets in the Sorted table of FIG. 8 are thrown out, which leaves behind the next live Matched Markets.

Then, the best half of the remaining Matched Markets is identified and an average of those bids and offers in the best half is calculated to be the Mid Fixing price.

Whether the price levels are established through third-party benchmarks or mid-fixing processes, the price levels are typically limited to the IMM maturity dates with the following tenors: 6-month, 1-year, 2-year, 3-year, 4-year, 5-year, 7-year and 10-year. To obtain price levels for intermediate dates between consecutive IMM dates, it may be desirable to follow the market standard convention and use a linear interpolation. Alternatively, participating dealers may provide marks at one or more intermediate maturities.

Referring back to FIG. 2, in step 212, the credit derivative trades may be executed and the trade data may be passed on to an automated trade capture and processing system. As a result, participants would not be required to manually enter trades generated by the auction into their respective trade capture systems. A manual entry approach would require significant lime from traders and trading assistants and may expose all participants to operational risks due to errors in trade booking. The online trading system in which the auction session takes place may already provide straight-thru-processing (STP) capabilities for regular trades and may be adapted to support automated trade capture of the auction-generated trades.

As briefly described above, a delta-netting process that preserves delta neutrality for the trader clients may be a preferred approach to match offsetting positions among two or more trader clients. It should be noted that, in the context of the present invention, delta neutrality is not an absolute requirement in the sense that the net change in a trader's overall delta value has to be zero. Rather, if the net change in an overall delta value is within a sufficiently small range (e.g., no more than 100 or otherwise within an acceptable range as determined by traders or the trading system), then the auction process may be referred to as delta neutral.

Figure 3:
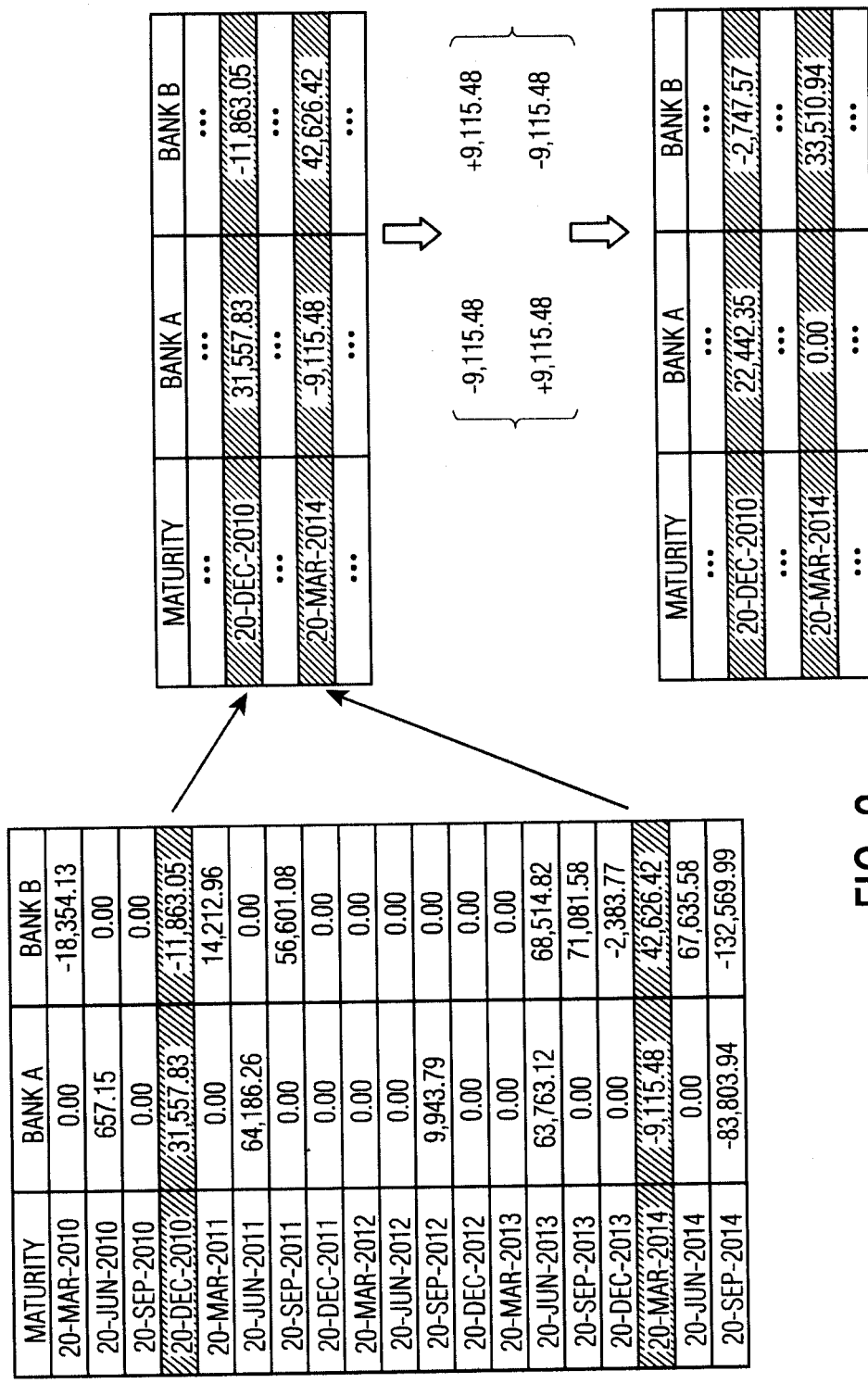
FIG. 3 shows a numerical example of a delta netting process involving two trader clients in accordance with one embodiment of the present invention.

FIG. 3 shows a numerical example of a delta netting process involving two trader clients (Bank A and Bank B) in accordance with one embodiment of the present invention. As shown in the table on the left side. Bank A and Bank B may have each submitted a plurality of delta positions for maturity dates between Mar. 20, 2010 and Sep. 20, 2014.

Note that, for maturity of 20 Dec. 2010, Bank A is long delta and Bank B is short delta. However, for 20 Mar. 2014. Bank A is short delta and Bank B is long delta. These four delta positions are highlighted in a simplified table on the top right of FIG. 3. Thus, all four of these delta positions may be reduced by executing two CDS trades with identical delta offset values between these two banks, one for each of these two maturities. That is, Bank A would buy protection from Bank B for the 20 Dec. 2010 maturity and sell protection to Bank B for the 20 Mar. 2014 maturity.

In a more general case, the delta netting process may be run to search for delta values i=1.2 for two banks (i=1, 2, for Bank A and Bank B respectively) and two dates (j=1, 2) that satisfy the following:

$$\delta_{1,1}\delta_{2,1}<0$$

$$\delta_{2,1}\delta_{2,2}<0$$

$$\delta_{2,2}\delta_{1,2}<0$$

That is to say, EITHER:

$\delta_{1,1}$ & $\delta_{2,2}$ are negative and $\delta_{2,1}$ & $\delta_{1,2}$ are positive, OR
$\delta_{1,1}$ & $\delta_{2,2}$ are positive and $\delta_{2,1}$ & $\delta_{1,2}$ are negative.

If a constraint is imposed such that no bank can have an individual delta position that changes sign, the delta offset value to be applied to the individual delta positions would have the smallest absolute delta value among the original delta positions. In the numerical example illustrated in FIG. 3, the delta position having the smallest absolute value belongs to Bank A and has a maturity of Mar. 20, 2014. which is −9,115.48. For delta netting, delta offset values of either +9,115.48 or −9,115.48 may be applied to the four delta positions held by Bank A and Bank B on the 20 Dec. 2010 and 20 Mar. 2014 maturity dates. Specifically, a −9,115.48 delta offset is applied to Bank A's 20 Dec. 2010 position and Bank B's 20 Mar. 2014 position, and a +9,115.48 delta offset is applied to Bank A's 20 Mar. 2014 position and Bank B's 20 Dec. 2010 position. That is, the same amount of delta offset is added to one maturity but subtracted from another maturity for each bank. As a result, the absolute delta values of all four positions are reduced, with Bank A's 20 Mar. 2014 position reduced to zero. At the same time, since the net delta offset applied to each bank's positions is zero, the overall delta for each bank remains unchanged.

Once the delta offset values have been determined, the notional amounts of the trades (i.e., Bank A buys from Bank B for the 20 Dec. 2010 maturity and sells to Bank B for the 20 Mar. 2014 maturity) may be calculated based on a "01 per million" factor. The "01 per million" factor is the delta value for a prototypical CDS contract of $1 MM notional. For the numerical example in FIG. 3, the "01 per million" may be 291.52 for the 20 Dec. 2010 maturity and 545.90 for the 20 Mar. 2014 maturity. For each maturity date, the notional amount of the required trade may be obtained by dividing the delta offset value with the corresponding "01 per million." Thus, the notional amount to be traded is $31.3 MM for the 20 Dec. 2010 maturity and $16.7 MM for the 20 Mar. 2014 maturity.

FIGS. 4A-4C shows a numerical example of a delta netting process involving multiple trader clients in accordance with one embodiment of the present invention.

The delta-netting process described above for an individual pair of dealers may be extended to multiple counterparties. In a multilateral case, a similar delta-netting algorithm may be run to search for all combinations of pairs of banks and pairs of maturities, wherein the first bank is long (short) at one maturity and short (long) delta at another maturity, and the other bank is the other way around. Delta offset values may then be applied to the delta positions that fit the above-described pattern. The algorithm may keep on looking for delta positions that fit this pattern until it can no longer make any changes. According to one embodiment, in practice, it may be advisable to first filter out small delta values below a certain threshold (say less than 100). Without this initial filtering, the algorithm might create lots of trades in small notional amounts.

FIG. 4A shows original delta positions as submitted by five banks, Banks A-E. While the total (net) delta value for each bank is small (no more than 224), the total absolute delta and the variance are quite large. As mentioned above, it may be desirable to filter out small delta values—in this case, delta positions with absolute values less than 100 may be set to zero. Thus, FIG. 4B shows a filtered set of delta positions held by Banks A-E. Note that the total (net) delta value for each bank does not change significantly even after the small deltas are filtered out. Next, the above-described delta-netting process may be iteratively run on the filtered set of delta positions, and the resulting delta positions are listed in a "Netted Deltas" table in FIG. 4C wherein the shaded cells are those delta positions which have been either reduced (in an absolute sense) or eliminated. Comparing the total (net) delta values, the total absolute delta values, and the variance of the delta values before versus after the netting procedure, it may be noted that the total net delta values remain substantially unchanged for all the banks, while the total absolute delta values and the variance are significantly reduced. On average, the reduction in the absolute delta values is 32%, and the average reduction of the variance is 31%.

As a result of the delta netting procedure with this hypothetical data, 47 individual CDS trades are to be executed. Note that there are not an even number of trades in this case as the netting algorithm also nets the CDS trades as they are created.

According to embodiments of the present invention, this delta netting process may be able to achieve a relatively greater reduction in curve positions when (a) there are a larger number of dealers participating and (b) the participating dealers have many non-zero bucketed deltas.

Figure 5:
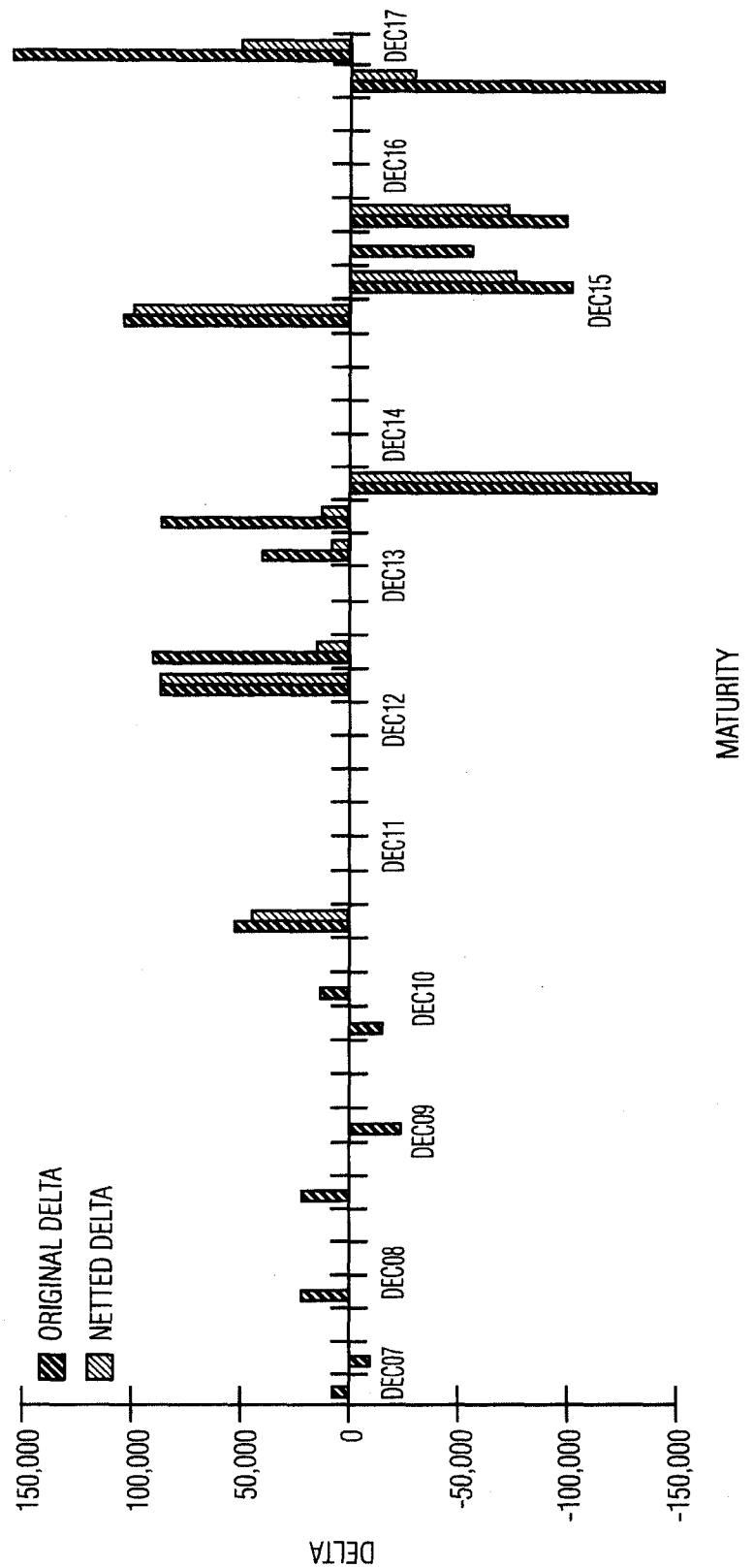
FIG. 5 shows a bar chart illustrating a reduction of delta values after a delta netting process in accordance with one embodiment of the present invention.

FIG. 5 shows a bar chart illustrating a reduction of delta values after a delta netting process in accordance with one embodiment of the present invention. Compared to the original delta values, the netted delta values are made smaller to various extents.

The delta-netting approach may employ some standard analytics (e.g., discount and CDS default probability curve construction) to allow the delta adjustments that lake place during the netting process to be converted into notional amounts. The interest rate and CDS curve building procedures, and the subsequent discounting and risk-neutral default probabilities that are used in the exemplary calculations above compare favorably with other analytics packages such as those provided by Bloomberg, I.P.

There are many variations of the above-described delta-netting procedure. With the common goal of reducing individual delta values while keeping an overall or net delta value of each trader client within a limited range, a computer-implemented trading system may search for offsetting delta positions and apply delta offset values in a number of different ways.

FIG. 6 shows a numerical example of multiple-leg delta weighted switches in accordance with one embodiment of the present invention. In FIG. 6, filtered delta positions of Traders A through E are listed for multiple maturity dates. A search may be conducted to identify a series of offsetting positions held by a number of traders for a number of maturities wherein the series of positions may form a closed "path" or "loop." Note that the six shaded cells present an opportunity for delta netting among Traders B, C and E. Note also that the arrows connecting these six cells form a looped path and, along the path, the delta positions alternate signs. For each of the maturities 20 Mar. 2010, 20 Mar. 2011, and 20 Sep. 2013, two of the three traders have offsetting positions. In addition, for each of the three traders, its delta values have different signs on the two maturities highlighted. These six delta values are shown in the following 3×3 matrix:

$$\delta_{filtered} = \begin{Bmatrix} -18,354.13 & 7,683.70 & \ldots \\ \ldots & -1,265.80 & 13,966.94 \\ 71,081.58 & \ldots & -15,340.77 \end{Bmatrix}$$

The smallest absolute delta value among the six positions is Trader C's at maturity 20 Mar. 2011, i.e., −1.265.80 at center of the matrix. According to an embodiment of the present invention, this smallest absolute delta value 1,265.80 may be added or subtracted from the six delta positions, as shown below:

$$\Delta\delta = \begin{Bmatrix} +1,265.80 & -1,265.80 & \\ & +1,265.80 & -1,265.80 \\ -1,265.80 & & +1,265.80 \end{Bmatrix}$$

$$\delta_{netted} = \delta_{filtered} \oplus \Delta\delta = \begin{Bmatrix} -17,088.33 & 6,417.90 & \ldots \\ \ldots & 0.00 & 12,701.14 \\ 69,815.78 & \ldots & -14,074.97 \end{Bmatrix}$$

As a result, three trades may be executed for the three respective maturities in order to realize these delta values ($\Delta\delta$).

A same or similar delta-netting process as illustrated in FIG. 6 may be repeatedly applied to the delta matrix. That is, the netted delta matrix may be again searched to identify a similar pattern and accordingly another set of delta offset values be applied. The delta-netting process may be repeated until no more delta positions can be offset or when the delta variance (or total absolute delta) falls below a predetermined threshold.

The delta-netting process as illustrated in FIG. 6 may also be extended to a series of eight (or 2N) delta positions held by four (or N) traders for four (or N) maturities. For example, the above-mentioned closed-loop path may be formed in a delta matrix (i.e., a set of filtered delta values) by starting from a first delta position and hopping 2N times through N-1 other delta positions and finally back to the first delta position. The first hop is in a horizontal direction (i.e., in the same row as the first delta position), the second hop is in a vertical direction from the second delta position, the third hop is in a horizontal direction from the third delta position, and so on. The last (2N-th) hop is from a 2N-th delta position vertically to the first delta position, which means both the 2N-th delta position and the first delta position are held by the same trader. In addition, the delta values along the 2N-hop path alternate in signs. With this pattern, delta netting may be achieved simultaneously for the N traders by executing N trades for the N maturities.

FIG. 7 shows another numerical example of multiple leg delta weighted switches in accordance with one embodiment of the present invention. Similar to the example shown in FIG. 6, three banks (Banks X, Y, and Z) may be identified as holding offsetting positions involving three maturity dates (Maturities 1-3). What is different is that the trades to realize delta offsets may be executed among three banks for some of the maturities. To illustrate an ideal pattern, the delta positions in FIG. 7 are shown in multiples of δ in the delta matrix on top of the page. Then, a 3×3 matrix with non-uniform delta offset values may be applied to the delta matrix, reducing all the delta values to zero in a delta-neutral fashion. To realize the delta offsets, a trade involving Bank X, Bank Y, and Bank Z at Maturity 1 is to be executed where Bank X sells to both Bank Y and Bank Z. Similarly, for Maturity 3, Bank X may buy from both Bank Y and Bank Z.

The above description covers a number of exemplary matching techniques that can be used to reduce delta values of credit risk positions for various traders. It should be noted that some or all of these techniques may be combined or alternated when processing multiple delta positions held by multiple trader clients. For example, according to embodiments of the present invention, one delta-neutral matching technique may be combined with another delta-neutral technique or a non-delta-neutral technique. For instance, an auction process may start a first round of delta reduction with a delta-neutral algorithm and then apply the simple pro-rata matching algorithm in a second round to the netted deltas that result from the first-round of delta netting. Similarly, the delta-netting methods (and/or variations thereof) involving two trader clients, such as those illustrated in FIGS. 3 and 4A-4C, may be applied to a delta matrix simultaneously or alternatively with the delta-netting methods (and/or variations thereof) involving multiple trader clients, such as those illustrated in FIGS. 6 and 7.

FIGS. 9-13 show exemplary screenshots of a delta netting process in an online credit derivative trading system in accordance with one embodiment of the present invention. In general, the delta netting process may be carried out in a plurality of stages including a pre-submission phase, a submission phase, a mid review phase, and a trade review phase.

Figure 9:
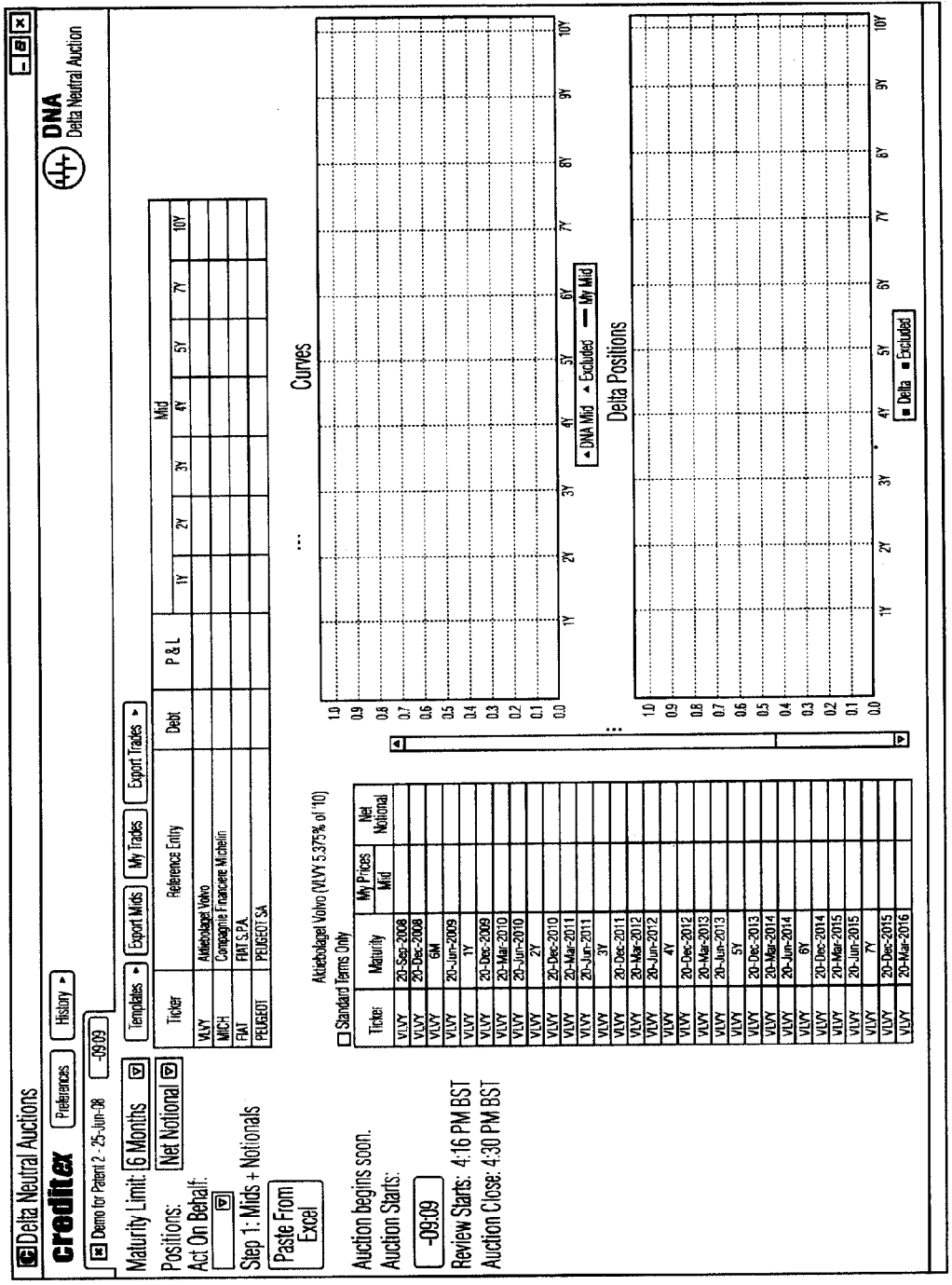

FIG. 9 shows a screenshot of what a trader sees during the pre-submission phase. The pre-submission phase may last a relatively long period of time such as a few hours prior to the official start of the delta netting process (also referred to as a delta neutral auction or "DNA" as indicated in the top-right corner of the screen). The graphical user interface (GUI) may include a number of pull-down menus, checkboxes, spreadsheets, charts, and other items to facilitate both the display of information to the trader and the input of data from the trader. For example, an "Auction Starts" count-down clock may continuously remind the trader of the time remaining until the auction starts. A "Maturity Limit" pull-down menu may allow the trader to limit the gap between two trades in any potential switch. A "Positions" pull-down menu may allow the trader to specify whether the credit risk positions uploaded are in terms of net notional or delta value.

In addition, when a trader first starts uploading its risk positions, a pop-out window or a similar visual prompt may force the trader to answer a simple yet critical question as to what a positive delta (or a positive net notional) and a negative delta (or a negative net notional) mean to the trader (or its organization) in terms of buying or selling credit protection. It has been discovered that different traders and organizations may view the meaning of positive and negative delta values quite differently. Some may view a negative delta as necessitating a sell while others may view the same as requiring a buy. To resolve this problem, the online credit derivative trading system may normalize trader clients' views of "risk" vs. "hedge" by querying each trader who attempts to participate in the DNA auction process. Based on the response received, the system will understand and remember how the trader views its positions and may process that trader's risk positions accordingly.

Referring back to FIG. 9, a first spreadsheet on top side of the screen may display one or more reference entities available for the upcoming DNA auction and dynamically update information related to those entities. A second spreadsheet toward lower left of the screen provides space for the trader to upload his risk positions with respect to the reference entities. The upload of risk positions may be performed manually one line at a time or may be through a batch (automated) operation such as copying-and-pasting or converting from an Microsoft® Excel spreadsheet or from any other application that supports TAB or CSV delimited interchange via the system clipboard.

Traders may be able to upload their risk positions in either the pre-submission phase or the submission phase. Traders may be required to enter either a mid or a bid-offer combination for each maturity bucket on a reference entity name that they wish to reduce their risk on. If no mid or bid/offer is entered, the trader does not have the opportunity to see the DNA mid (to be displayed in subsequent phases) nor is the trader able to submit a delta position. The trader can choose to enter mids for standard terms only, and the mids for remaining maturities will be generated using linear interpolation. The trader may be able to edit any interpolated mid. In addition to entering a mid, a trader can enter a delta position or net notional for each maturity bucket on a reference entity name for which they wish to reduce their risk on. Adding delta/net notional values is optional during pre-submission or submission phases. If no values are entered during these phases, the trader has an opportunity to edit the delta values or net notionals in the mid review phase prior to calculating the DNA switch trades.

Figure 10:
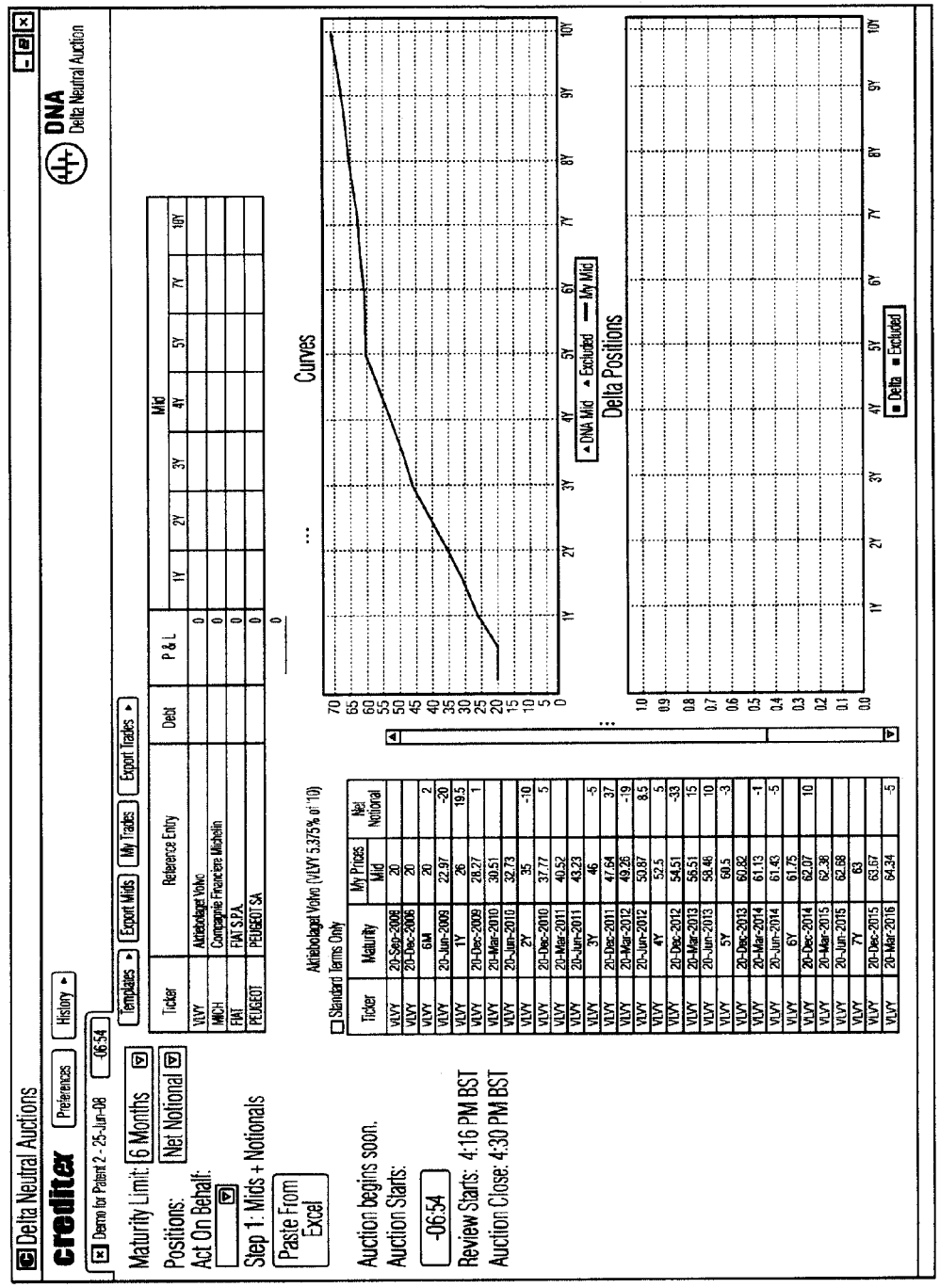
Figure 11:
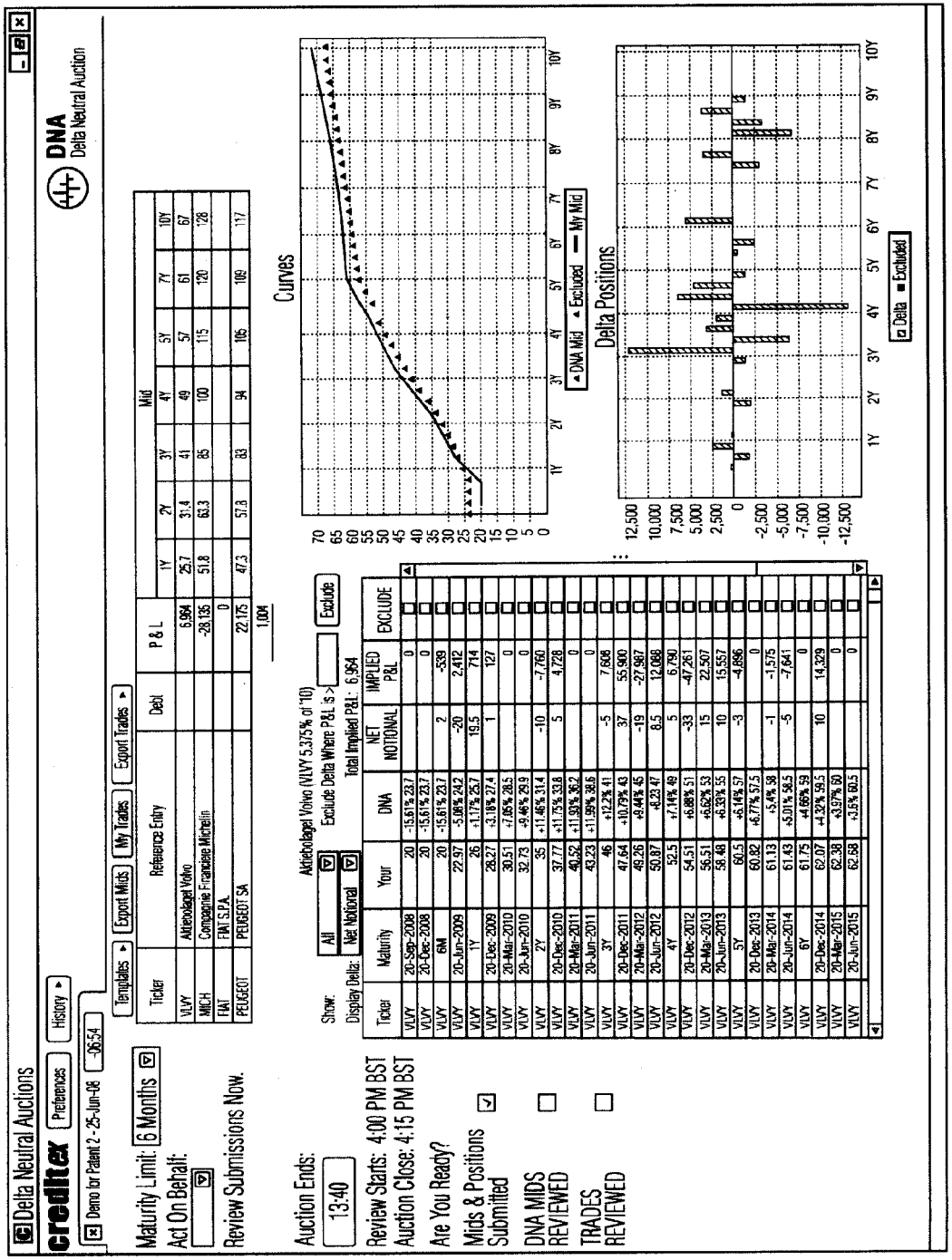

In FIG. 10, which shows a screenshot of the submission phase, the count-down clock is showing less than seven minutes before the official submission phase ends. As shown in the second spreadsheet, the trader has entered a mid for each maturity on the reference entity VLVY (Volvo AB) as well as desired net notionals for some of the maturity dates. On the right side of the screen, a first chart entitled "Curves" has plotted out a first curve corresponding to the trader's input. Once finished with data input, the trader may indicate that it is ready to proceed to the next phase, for example, by checking a "MIDS & POSITIONS SUBMITTED" box as shown in FIG. 11.

Once all traders have signaled that they are done with uploading their risk positions or as soon as the submission phase ends, the trading system may automatically calculate auction price levels (DNA mids) and delta values for each maturity date based on the traders' input. FIG. 11 shows a screenshot of what the trader sees in a mid review phase, after the system has calculated DNA mids and delta values (or net notionals). Now, the second spreadsheet shows additional information compared to the previous screen in FIG. 10. A DNA column now shows, next to the trader-submitted mids, the DNA mids calculated by the system. To further assist the trader to decide whether to proceed with the trades, a number of visual aids are provided on this screen. For example, the system-calculated DNA mids are plotted in the Curves chart in comparison to the trader-submitted mids. The delta values are displayed for each maturity in a bar chart entitled "Delta Positions."

Furthermore, the system may automatically calculate an implied profit and loss (P&L) value for each reference entity and/or each maturity date based on the difference between the trader-submitted mids and the DNA mids. For example, the implied P&L may be the difference (between the trader-submitted mids and the DNA mids) multiplied by the trader's delta value at that particular maturity. The implied P&L provides a convenient indication to the trader the potential profit or loss if the trader decided to go forward with a trade at the DNA mid to reduce that delta position to zero. The further away the DNA mid is from the trader-submitted mid, the larger the impact on the trader's P&L. Thus, the trader can quickly make a decision. If the trader decided not to proceed with a trade on a particular maturity, a corresponding checkbox in an "Exclude" column may be checked to opt out of that trade. This opt-out arrangement is more efficient and convenient for the traders than the traditional opt-in arrangements implemented in other electronic trading systems. As the trader checks or un-checks the Exclude checkboxes, the implied P&L totals in the first spreadsheet (on top side of the screen) may update dynamically and the Curves and Delta Positions graphs may simultaneously indicate (e.g., in black triangles and black bars respectively) which bucket has been excluded.

Figure 13:
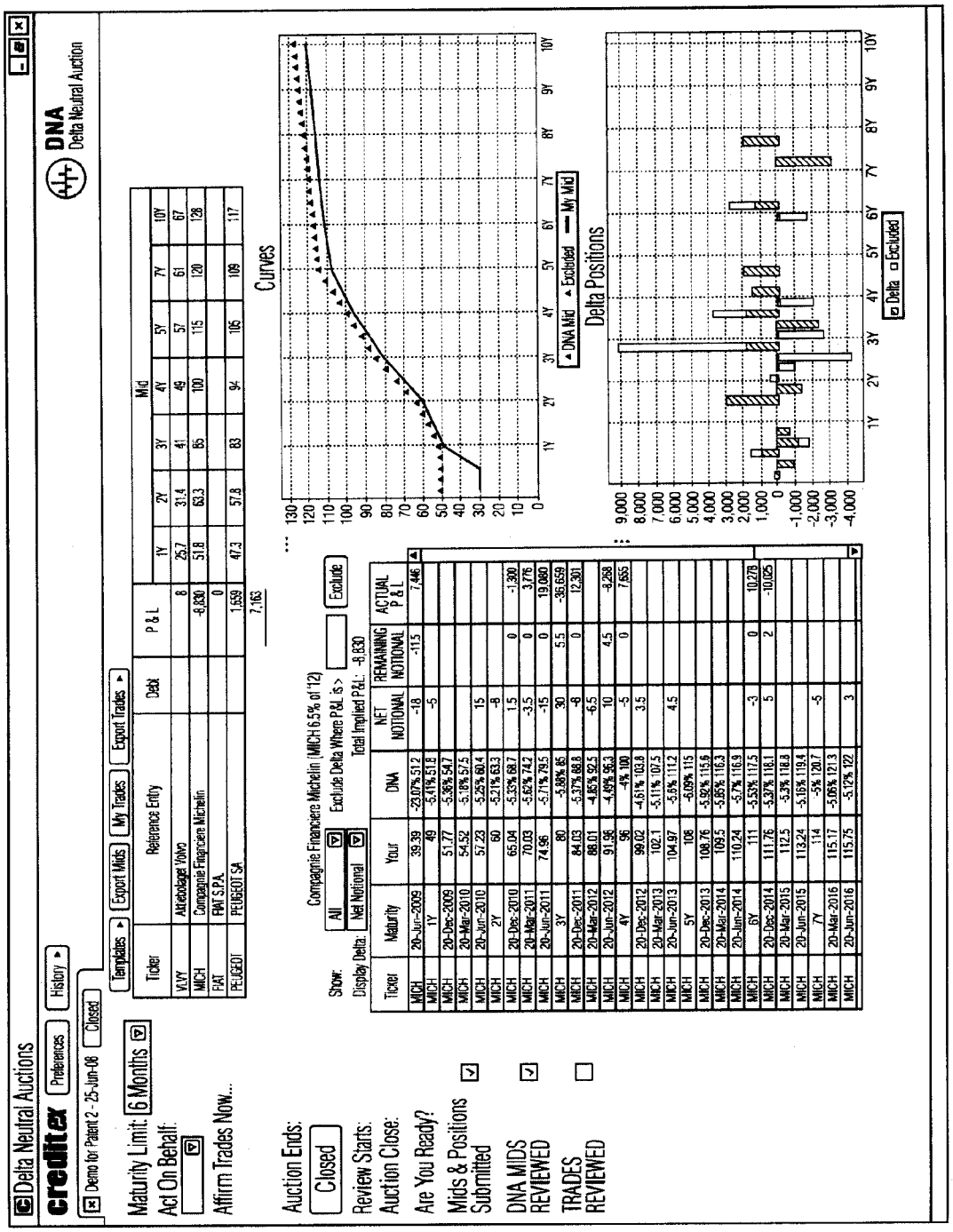

When the trader has finished reviewing the DNA mids and delta values, the trader may check a "DNA MIDS REVIEWED" checkbox. Once all traders have finished the mid review or when the mid review period expires, a DNA auction algorithm may be run to match the risk positions. Then, in the trade review phase, a list of the matched positions may be displayed, such as in a DNA Auction Trade Summary screen in FIG. 12. Here, each trader can review the trades generated through the DNA auction algorithm. To facilitate this review, one or more actual P&L values may be calculated and displayed to the trader. The actual P&L may be calculated on a per credit basis and/or a per delta neutral switch basis. For example, the actual P&L may be the difference between the trader-submitted mid and the DNA mid, multiplied by the delta value reduced by the DNA algorithm. If the trader does not want to complete a trade, the trader may indicate as such in an Edit Trade column. If either party to a particular trade backs out, then the trade will not be booked. When any trade is cancelled or withdrawn in the trade review phase, the corresponding actual P&L may be updated in a main screen as shown in FIG. 13. The actual P&L values for the individual maturity dates are displayed in the second spreadsheet. The total actual P&L values for the reference entities are displayed in the first spreadsheet on the top side of the screen. In addition, the Delta Positions graph may indicate the change in delta value and the remaining delta value for each maturity date, providing a visual illustration of potential impact on the trader's delta positions. Once a trader has finished reviewing the trades, a "TRADES REVIEWED" checkbox may be checked in either the DNA Auction Trade Summary screen (FIG. 12) or the trade review main screen (FIG. 13).

Once all the traders have finished their trade review or upon expiration of the trade review period, the trades not cancelled or withdrawn may be executed and the resultant transaction data may be forwarded for straight-through-processing (STP). Alternatively, a list of executed trades can be exported from the DNA application or the online trading system.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for reducing delta values of credit risk positions in an online trading system of credit derivatives, the method comprising:
  receiving, in the online trading system of credit derivatives, a plurality of credit risk positions submitted by a plurality of trader clients, each credit risk position having a delta value and a maturity date, wherein each trader client's submission is unknown to other trader clients:
  identifying, by the online trading system, at least two of the plurality of trader clients who hold offsetting credit risk positions on at least two maturity dates;
  determining, by the online trading system, delta offset values to be applied to delta values of the credit risk positions held by the at least two trader clients and having the at least two maturity dates, such that an overall delta of each of the at least two trader clients' credit risk positions remains substantially unchanged after the application of the delta offset values;
  calculating, by the online trading system, notional amounts of credit derivative trades needed to realize the determined delta offset values; and
  executing, by online trading system, the credit derivative trades among the at least two trader clients.

2. The method according to claim 1, further comprising:
  designating a single sector of credit derivatives for a delta neutral auction session.

3. The method according to claim 1, further comprising:
  inviting the plurality of trader clients to upload the plurality of credit risk positions to the online trading system of credit derivatives.

4. The method according to claim 3, wherein the plurality of credit risk positions are uploaded to the online trading system of credit derivatives in a spreadsheet format.

5. The method according to claim 3, further comprising:
  inviting the plurality of trader clients to upload one or more prices associated with the plurality of credit risk positions, the one or more prices being selected from a group consisting of: a bid price, an offer price, and a suggested mid price.

6. The method according to claim 3, wherein information associated with each of the plurality of credit risk positions uploaded includes:
  a reference entity name;
  a seniority level;
  a maturity date; and
  an amount that reflects either a delta position at the maturity date or an equivalent net CDS notional amount.

7. The method according to claim 1, further comprising:
  receiving, from the plurality of trader clients, delta values of the plurality of credit risk positions.

8. The method according to claim 1, further comprising:
  calculating, by the online trading system, delta values of the plurality of credit risk positions.

9. The method according to claim 1, further comprising:
  identifying a first trader client and a second trader client, wherein the first trader client holds a first credit risk position that at least partially offsets a second credit risk position held by the second trader client, the first and second credit risk positions sharing a first maturity date, wherein the first trader holds a third credit risk position that at least partially offsets a fourth credit risk position held by the second trader client, the third and fourth credit risk positions sharing a second maturity date, and wherein the first credit risk position at least partially offsets the third credit risk position and the second credit risk position at least partially offsets the fourth credit risk position.

10. The method according to claim 9, further comprising:
  determining delta values for the first, second, third, and fourth credit risk positions; and
  causing each of the delta offset values to have the smallest absolute delta value out of the delta values.

11. The method according to claim 1, further comprising:
  filtering out a subset of the plurality of credit risk positions that have absolute delta values below a predetermined threshold.

12. The method according to claim 1, further comprising:
  determining, by the online trading system of credit derivatives, one or more price levels for executing the credit derivative trades among the at least two trader clients.

13. The method according to claim 12, wherein the one or more price levels are determined based on a third-party benchmark.

14. The method according to claim 12, wherein the one or more price levels are determined in a mid-fixing process based on bid and offer prices submitted by at least some of the plurality of trader clients.

15. The method according to claim 12, wherein the one or more price levels are determined based on suggested mid prices submitted by at least some of the plurality of trader clients.

16. The method according to claim 1, further comprising:
  offering a trader client an opportunity to opt out of a potential trade involving a credit risk position.

17. The method according to claim 1, further comprising:
  calculating a profit and loss (P&L) value for a trader client based on a difference between a suggested mid price submitted by the trader client and a price level determined by the online trading system of credit derivatives.

18. The method according to claim 1, further comprising:
  providing one or more visual aids to the trader client via a graphical user interface (GUI), the visual aids being selected from a group consisting of: (1) one or more informational spreadsheets displaying credit risk positions, price levels, and profit and loss (P&L) values: and (2) one or more graphs displaying price levels, delta values, or changes thereof.

19. The method according to claim 1, further comprising:
  limiting a maximum gap between the at least two maturity dates.

20. The method according to claim 1, further comprising:
  querying each trader client to determine how that trader client views positive and negative signs of a delta value in relation to buy or sell transactions; and
  processing credit risk positions submitted by that trader client in a manner consistent with the query result.

21. An electronic trading system of credit derivatives, the system comprising:
  a processor;
  at least one storage device coupled to the processor;
  a user interface coupled to the processor via one or more communication networks;
  wherein the processor is configured to communicate with the at least one storage device and the user interface to execute instructions to perform the following tasks:
    receiving, in the online trading system of credit derivatives, a plurality of credit risk positions submitted by a plurality of trader clients, each credit risk position having a delta value and a maturity date, wherein each trader client's submission is unknown to other trader clients;

identifying, from the plurality of trader clients, at least two trader clients who hold offsetting credit risk positions on at least two maturity dates;

determining delta offset values to be applied to delta values of the credit risk positions held by the at least two trader clients and having the at least two maturity dates, such that an overall delta of each of the at least two trader clients' credit risk positions remains substantially unchanged after the application of the delta offset values;

calculating, based on the determined delta offset, values, notional amounts of credit derivative trades needed to realize the delta offset values; and executing the credit derivative trades among the at least two trader clients.

* * * * *